United States Patent
Hwang

(10) Patent No.: US 8,559,311 B2
(45) Date of Patent: Oct. 15, 2013

(54) WIRELESS NETWORK USING SUPERPOSITION CODING SCHEME

(75) Inventor: Chan Soo Hwang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 728 days.

(21) Appl. No.: 12/610,421

(22) Filed: Nov. 2, 2009

(65) Prior Publication Data

US 2010/0110970 A1     May 6, 2010

(30) Foreign Application Priority Data

Nov. 4, 2008   (KR) .................. 10-2008-0108715

(51) Int. Cl.
*G01R 31/08* (2006.01)

(52) U.S. Cl.
USPC ................ 370/235; 370/312; 370/352

(58) Field of Classification Search
USPC .................. 370/315, 235, 312, 352
See application file for complete search history.

(56) References Cited

U.S. PATENT DOCUMENTS

| | | | |
|---|---|---|---|
| 2007/0250638 A1* | 10/2007 | Kiran et al. | 709/236 |
| 2007/0297498 A1* | 12/2007 | Kramer | 375/211 |
| 2008/0227388 A1* | 9/2008 | Popovski et al. | 455/17 |
| 2009/0010216 A1* | 1/2009 | Li et al. | 370/329 |
| 2010/0246560 A1* | 9/2010 | Kim | 370/345 |
| 2010/0278169 A1* | 11/2010 | Wang et al. | 370/345 |

* cited by examiner

Primary Examiner — Sai-Ming Chan
(74) Attorney, Agent, or Firm — NSIP Law

(57) ABSTRACT

An operation method of a relay node in a wireless network using a superposition coding scheme is provided. In particular, a relay node may receive a first transmission message from a first source node in a first time slot. The relay node may also receive a second transmission message from a second source node in a second time slot. The relay node may then transmit a relay message to a first destination node corresponding to the first source node and a second destination node corresponding to the second source node in a third time slot, the relay message being associated with the first transmission message and the second transmission message.

20 Claims, 10 Drawing Sheets

M11 → M11-1 + M11-2
M12 → M12-1 + M12-2
M21 → M21-1 + M21-2
M22 → M22-1 + M22-2

WIRELESS NETWORK USING SUPERPOSITION CODING SCHEME

CROSS-REFERENCE TO RELATED APPLICATION

This application claims the benefit under 35 U.S.C. §119(a) of a Korean Patent Application No. 10-2008-0108715, filed on Nov. 4, 2008, in the Korean Intellectual Property Office, the entire disclosure of which is incorporated herein by reference for all purposes.

BACKGROUND

1. Field

The following description relates to a wireless network using a superposition coding scheme, and more particularly, to a technology that may efficiently use time resource using the superposition coding scheme.

2. Description of the Related Art

In various communication protocols applicable to a wireless network, nodes of the wireless network may have limited transmission power, and states of channels among nodes may change. Accordingly, throughput of the wireless network may not easily increase.

A network coding scheme applicable to a wireless network has been considered. In a wireless network using a network coding scheme, a relay node may appropriately encode messages corresponding to at least two nodes, generate a network-coded message, and transmit the network-coded message to the at least two nodes. In this instance, the at least two nodes may appropriately decode the network-coded message, and thereby may extract desired messages.

Generally, a network coding scheme is used to increase throughput of a wireless network. However, since a state of a wireless channel may change, it is desired to use a network coding scheme optimized based on a state of a wireless channel. Also, a technology to apply a superposition coding scheme to a wireless network is desired.

SUMMARY

In one general aspect, there is provide an operation method of a relay node. The operation method may include receiving a first transmission message from a first source node in a first time slot, the first transmission message being generated using a 1-1 partial source message and a 1-2 partial source message included in a first source message corresponding to the first source node based on a superposition coding scheme, receiving a second transmission message from a second source node in a second time slot, the second transmission message being generated using a 2-1 partial source message and a 2-2 partial source message included in a second source message corresponding to the second source node based on the superposition coding scheme, and transmitting a relay message to a first destination node corresponding to the first source node and a second destination node corresponding to the second source node in a third time slot, the relay message being associated with the first transmission message and the second transmission message.

The first transmission message may be generated based on the superposition coding scheme to enable the relay node to extract the 1-1 partial source message and the 1-2 partial source message from the first transmission message, and to enable the second destination node to extract the 1-1 partial source message from the first transmission message.

The first transmission message may be generated based on at least one of a channel between the first source node and the relay node and a channel between the first source node and the second destination node.

The second transmission message may be generated based on the superposition coding scheme to enable the relay node to extract the 2-1 partial source message and the 2-2 partial source message from the second transmission message, and to enable the first destination node to extract the 2-1 partial source message from the second transmission message.

The second transmission message may be generated based on at least one of a channel between the second source node and the relay node and a channel between the second source node and the first destination node.

A length of each of the first time slot, the second time slot, and the third time slot may be adjusted to maximize a sum data rate for the first destination node and the second destination node.

Each of the first destination node and the second destination node may extract the first source message and the second source message using the relay message, respectively.

The transmitting of a relay message may further include generating the relay message using the 1-1 partial source message, the 1-2 partial source message, the 2-1 partial source message, and the 2-2 partial source message based on the superposition coding scheme.

The transmitting of a relay message may further include generating the relay message using the first source message and the second source message based on the superposition coding scheme.

The transmitting of a relay message may include generating a network-coded message based on the 1-1 partial source message and the 2-1 partial source message, the network-coded message being included in the relay message.

The first destination node may overhear the first transmission message to extract the 1-1 partial source message, and the second destination node may overhear the second transmission message to extract the 2-1 partial source message.

In another aspect, an operation method of a relay node is provided wherein the operation method may include receiving, in a first time period, a first transmission message from a first source node, and a second transmission message from a second source node, the first transmission message being generated using a 1-1 partial source message and a 1-2 partial source message included in a first source message corresponding to the first source node based on a superposition coding scheme, the second transmission message being generated using a 2-1 partial source message and a 2-2 partial source message included in a second source message corresponding to the second source node based on the superposition coding scheme, extracting the first transmission message and the second transmission message based on a Successive Interference Cancellation (SIC) scheme, and transmitting a relay message to a first destination node corresponding to the first source node and a second destination node corresponding to the second source node in a second time period, the relay message being associated with the first transmission message and the second transmission message.

The transmitting of a relay message may further include generating the relay message using the first source message and the second source message based on the superposition coding scheme.

The first destination node may overhear the first transmission message to extract the 1-1 partial source message, and the second destination node may overhear the second transmission message to extract the 2-1 partial source message.

Each of the first destination node and the second destination node may extract the first source message and the second source message using the relay message, respectively.

The first transmission message may be generated based on the superposition coding scheme to enable the relay node to extract the 1-1 partial source message and the 1-2 partial source message from the first transmission message, and to enable the second destination node to extract the 1-1 partial source message from the first transmission message, and the second transmission message is generated based on the superposition coding scheme to enable the relay node to extract the 2-1 partial source message and the 2-2 partial source message from the second transmission message, and to enable the first destination node to extract the 2-1 partial source message from the second transmission message.

The extracting of the first transmission message and the second transmission message may extract the first transmission message and the second transmission message according to a predetermined decoding order.

A length of each of the first time period and the second time period may be adjusted to maximize a sum data rate for the first destination node and the second destination node.

In yet another aspect, a computer-readable storage medium storing a program to provide an operation method of a relay node, comprising instructions to cause a computer to receive a first transmission message from a first source node in a first time period, the first transmission message being generated using a 1-1 partial source message and a 1-2 partial source message included in a first source message corresponding to the first source node based on a superposition coding scheme, receive a second transmission message from a second source node in a second time period, the second transmission message being generated using a 2-1 partial source message and a 2-2 partial source message included in a second source message corresponding to the second source node based on the superposition coding scheme, and transmit a relay message to a first destination node corresponding to the first source node and a second destination node corresponding to the second source node in a third time period, the relay message being associated with the first transmission message and the second transmission message, is provided.

Other features and aspects will be apparent from the following detailed description, the drawings, and the claims.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
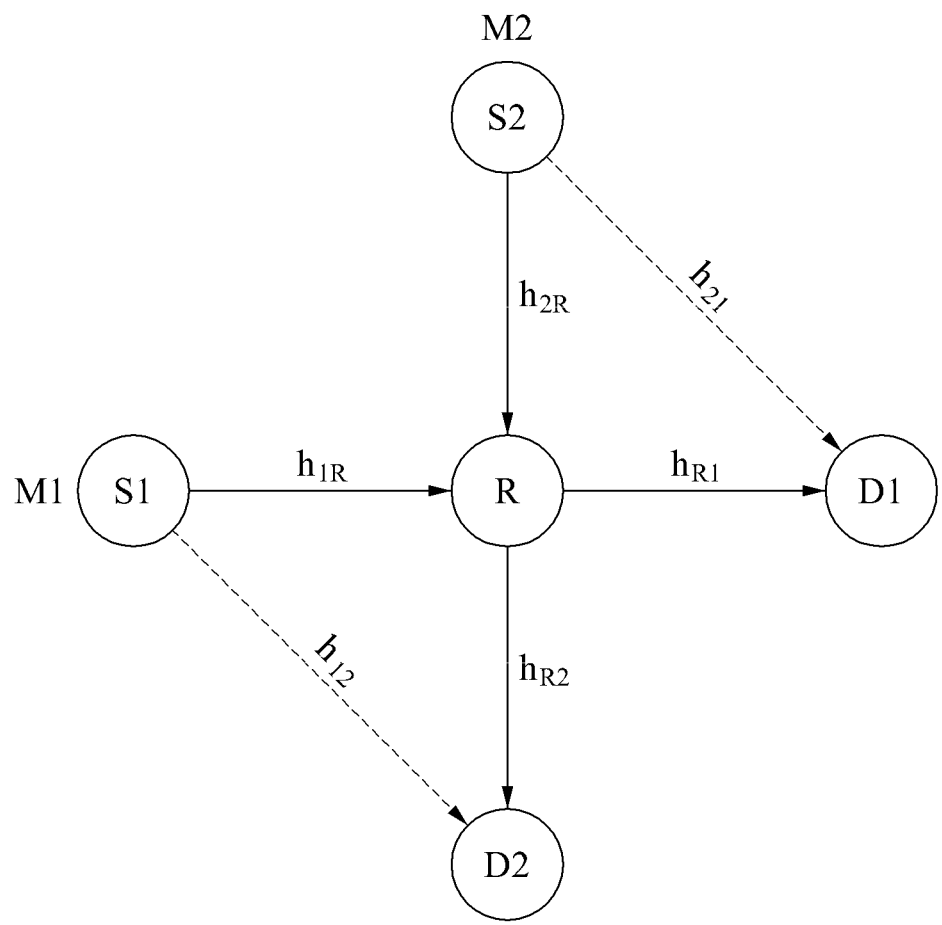
FIG. 1 is a diagram illustrating an exemplary wireless network.

FIG. 1 illustrates an exemplary wireless network.

The wireless network may include a first source node S1, a second source node S2, a relay node R, a first destination node D1, and a second destination node D2.

Here, a channel $h_{1R}$ may be a channel from the first source node S1 to the relay node R, and a channel $h_{2R}$ may be a channel from the second source node S2 to the relay node R. Also, a channel $h_{R1}$ may be a channel from the relay node R to the first destination node D1, and a channel $h_{R2}$ may be a channel from the relay node R to the second destination node D2. Also, a channel $h_{12}$ may be a channel from the first source node S1 to the second destination node D2, and a channel $h_{21}$ may be a channel from the second source node S2 to the first destination node D1. In this instance, the channel $h_{1R}$ and the channel $h_{2R}$ may be a direct channel, and the channel $h_{12}$ and the channel $h_{21}$ may be an overhearing channel.

It may be assumed, for example, that the first source node S1 is paired with the first destination node D1, and a first source message M1 may be transmitted by the first source node S1 to the first destination node D1. Also, it may be assumed, for example, that the second source node S2 is paired with the second destination node D2, and a second source message M2 may be transmitted by the second source node S2 to the second destination node D2.

Figure 2:
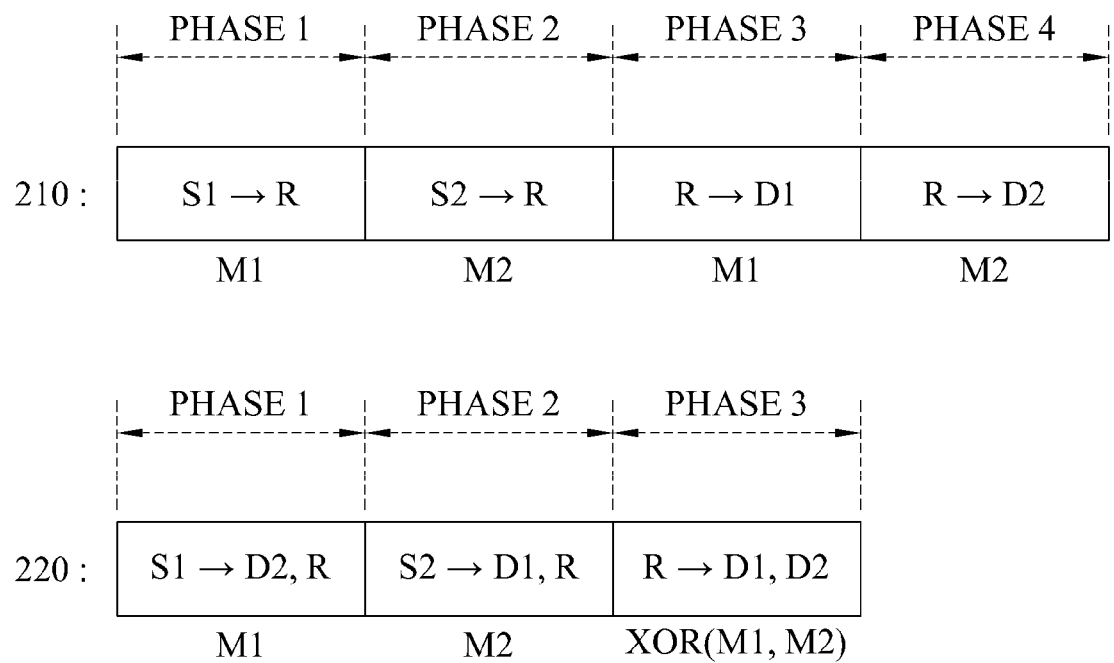
FIG. 2 is a diagram illustrating operations of an exemplary wireless network in each time period.

FIG. 2 illustrates operations of an exemplary wireless network in each time period.

The operations of the exemplary wireless network in each time period when the wireless network does not use a network coding scheme are illustrated in a first timeline 210 of FIG. 2.

For example, when the wireless network does not use the network coding scheme, four time periods are used so that a first source node S1 may transmit a first source message M1 to a first destination node D1, and a second source node S2 may transmit a second source message M2 to a second destination node D2.

That is, the first source node S1 may transmit the first source message M1 to a relay node R during a first time period (a first time slot). The first time period may correspond to a phase 1. The second source node S2 may transmit the second source message M2 to the relay node R during a second time period (a second time slot) corresponding to a phase 2. In this instance, the relay node R may transmit the first source message M1 and the second source message M2 to the first destination node D1 and the second destination node D2 during a third time period (a third time slot) and a fourth time period (a fourth time slot). The third time period and the fourth time period may correspond to a phase 3 and a phase 4, respectively.

Conversely, operations of the wireless network in each time period when the wireless network uses the network coding scheme are illustrated as an example in a second timeline 220 of FIG. 2. When the wireless network uses the network coding scheme, three time periods are required so that the first source node S1 may transmit the first source message M1 to the first destination node D1, and the second source node S2 may transmit the second source message M2 to the second destination node D2.

That is, the first source node S1 may transmit the first source message M1 to the second destination node D2 and the relay node R during the first time period. In this instance, the first source message M1 may be transmitted to the second destination node D2 through an overhearing channel $h_{12}$, and transmitted to the relay node R through a direct channel $h_{1R}$.

Also, the second source node S2 may transmit the second source message M2 to the relay node R and the first destination node D1 during the second time period. In this instance, the second source message M2 may be transmitted to the first destination node D1 through an overhearing channel $h_{21}$, and transmitted to the relay node R through a direct channel $h_{2R}$.

In this instance, the relay node R may encode the first source message M1 and the second source message M2, received during the first time period and the second time period, according to the network coding scheme. For example, the relay node R may encode the first source message M1 and the second source message M2 through an XOR operation, and thereby may generate a network-coded message, XOR(M1, M2).

During the third time period, the relay node R may transmit the network-coded message, XOR(M1, M2), to the first destination node D1 and the second destination node D2. In this instance, the first destination node D1 may extract the first source message M1 from the network-coded message, XOR (M1, M2), using the second source message M2 overheard during the second time period. Similarly, the second destination node D2 may extract the second source message M2 from the network-coded message, XOR(M1, M2), using the first source message M1 overheard during the first time period.

However, when the wireless network is operated as illustrated in the second timeline 220 of FIG. 2, various shortcomings may occur.

Generally, a state of the overhearing channels $h_{12}$ and $h_{21}$ may be inferior to a state of the direct channels $h_{1R}$ and $h_{2R}$. Accordingly, when the first source node S1 and the second source node S2 use the overhearing channels $h_{12}$ and $h_{21}$ during the first time period and the second time period, an applicable data rate of the first source node S1 and the second source node S2 may be limited by the state of the overhearing channels $h_{12}$ and $h_{21}$. For example, when the first source node S1 transmits the first source message M1 during the first time period, the first source node S1 may need to apply a low data rate to the second destination node D2 even though the first source node S1 may apply a high data rate to the relay node R. Accordingly, the applicable data rate of the first source node S1 may be reduced.

Also, when a state of the channels $h_{1R}$ and $h_{12}$ is significantly different from a state of the channels $h_{2R}$ and $h_{21}$, the network coding scheme is to be prevented from being applied to the first source node S1 and the second source node S2, since a quality of the network-coded message, XOR(M1, M2), may be determined based on channels with an inferior state from among the channels $h_{1R}$ and $h_{12}$ and the channels $h_{2R}$ and $h_{21}$. The channels $h_{1R}$ and $h_{12}$ may correspond to a flow of the first source message M1, and the channels $h_{2R}$ and $h_{21}$ may correspond to a flow of the second source message M2.

However, the wireless network may divide each of the first source message M1 and the second source message M2 into at least two partial source messages, and thus dependence on the overhearing channels $h_{12}$ and $h_{21}$ may be reduced. For example, when a state of the channel $h_{12}$ is significantly inferior to a state of the channel $h_{1R}$, the first source node S1 may transmit a portion of the first source message M1 to the relay node R and the second destination node D2 having a low data rate, and transmit a remaining portion of the first source message M1 to only relay node R having a high data rate, so that the second destination node D2 may perform decoding appropriately.

Also, the wireless network may appropriately adjust a length of a time period for the flows of the first source message M1 and the second source message M2. Accordingly, throughput of the wireless network may increase.

Exemplary operations of the wireless network are further described with reference to FIG. 3 through FIG. 5.

Figure 3:
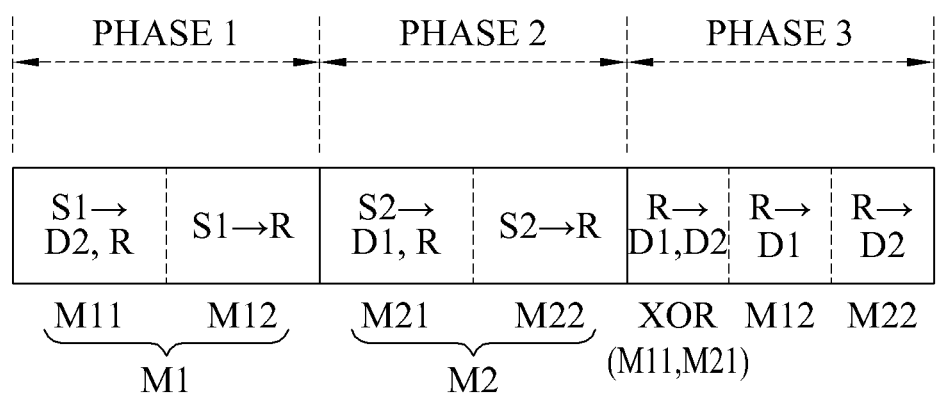
FIG. 3 is a diagram illustrating an operation of an exemplary wireless network using partial source messages in three time periods.

FIG. 3 illustrates an operation of an exemplary wireless network using partial source messages in three time periods.

A first source message M1 of a first source node S1 may be divided into a 1-1 partial source message M11 and the 1-2 partial source message M12. A second source message M2 of a second source node S2 may be divided into a 2-1 partial source message M21 and a 2-2 partial source message M22.

A first time period corresponding to a phase 1 may be divided into two periods. The first source node S1 may transmit the 1-1 partial source message M11 to a second destination node D2 and a relay node R during a first period of the first time period. In this instance, a data rate R11 applicable to the 1-1 partial source message M11 may be determined based on a state of each of an overhearing channel $h_{12}$ and a direct channel $h_{1R}$. Generally, since the state of the direct channel $h_{1R}$ may be superior to the state of the overhearing channel $h_{12}$, the data rate R11 applicable to the 1-1 partial source message M11 may be determined based on the state of the overhearing channel $h_{12}$ to enable the second destination node D2 and the relay node R to successfully perform decoding.

Also, the first source node S1 may transmit the 1-2 partial source message M12 to the relay node R during a second period of the first time period. In this instance, the first source node S1 may determine a data rate R12 applicable to the 1-2 partial source message M12 based on the state of the direct channel $h_{1R}$ to enable the relay node R to successfully perform decoding. Generally, since the state of the direct channel $h_{1R}$ may be superior to the state of the overhearing channel $h_{12}$, the data rate R12 may be determined to be higher than the data rate R11.

Accordingly, the 1-1 partial source message M11 may be transmitted by the first source node S1 to enable the second destination node D2 and the relay node R to successfully perform decoding, and the 1-2 partial source message M12 may be transmitted to enable the relay node R to successfully perform decoding.

Also, the second source node S2 may transmit the 2-1 partial source message M21 and the 2-2 partial source message M22 of the second source message M2 during a second time period corresponding to a phase 2.

The second source node S2 may transmit the 2-1 partial source message M21 to a first destination node D1 and the relay node R during a first period of the second time period. In this instance, a data rate R21 applicable to the 2-1 partial source message M21 may be determined based on a state of an overhearing channel $h_{21}$ and a state of a direct channel $h_{2R}$.

Also, the second source node S2 may transmit the 2-2 partial source message M22 to the relay node R during a second period of the second time period. In this instance, the second source node S2 may determine a data rate R22 applicable to the 2-2 partial source message M22 based on the state of the direct channel $h_{2R}$. Generally, since the state of the direct channel $h_{2R}$ may be superior to the state of the overhearing channel $h_{21}$, the data rate R22 may be determined to be higher than the data rate R21.

Accordingly, the 2-1 partial source message M21 may be transmitted to enable the first destination node D1 and the relay node R to successfully perform decoding, and the 2-2 partial source message M22 may be transmitted to enable the relay node R to successfully perform decoding.

Also, the relay node R may apply the network coding scheme to the 1-1 partial source message M11 and the 2-1 partial source message M21, and thereby may generate a network-coded message, XOR(M11, M21).

In this instance, the relay node R may transmit the network-coded message, XOR(M11, M21), to the first destination node D1 and the second destination node D2 during a first period of a third time period. The third time period may correspond to a phase 3. Also, the relay node R may transmit the 1-2 partial source message M12 to the first destination node D1 during a second period of the third time period, and transmit the 2-2 partial source message M22 to the second destination node D2 during a third period of the third time period.

The first destination node D1 may decode the network-coded message, XOR(M11, M21), using the overheard 2-1 partial source message M21, and thereby may extract the 1-1 partial source message M11. Similarly, the second destination node D2 may extract the 2-1 partial source message M21 from the network-coded message, XOR(M11, M21), using the overheard 1-1 partial source message M11.

Accordingly, although the state of the overhearing channels $h_{12}$ and $h_{21}$ may not be appropriate, the wireless network may appropriately control dependence on the overhearing channels $h_{12}$ and $h_{21}$ using partial source messages.

In this instance, the wireless network may optimize a length of each period included in the first time period, the second time period, and the third time period in order to maximize a sum data rate for the first destination node D1 and the second destination node D2. Here, the sum data rate may include a concept of a weighted sum data rate. The weighted sum data rate may be obtained by summing a value, obtained by multiplying a data rate for the first destination node D1 with a predetermined weight, and a value obtained by multiplying a data rate for the second destination node D2 with another predetermined weight. Also, the sum data rate may include a value obtained by adding the data rate for the first destination node D1 and the data rate for the second destination node D2.

Here, it may be assumed that, $$y_R(t) = h_{1R}x_1(t) + h_{2R}x_2(t) + n_R$$

$$y_{21} = h_{12}x_1(t) + n_{21}$$

$$y_{22} = h_{R2}x_R(t) + n_{22}$$

$$y_{11} = h_{21}x_2(t) + n_{11}$$

$$y_{12} = h_{R1}x_R(t) + n_{12} \quad \text{[Equation 1]}$$

where, $y_R(t)$ may denote a received signal of the relay node R, $x_1(t)$ may denote a transmission signal of the first destination node D1, $x_2(t)$ may denote a transmission signal of the second destination node D2, $n_R$, $n_{22}$, $n_{11}$, $n_{12}$ may denote noise $y_{21}$ may denote a received signal when the second destination node D2 overhears the transmission signal $x_1(t)$ $n_{21}$ may denote noise in the second destination node D2

$x_R$ may denote a transmission signal of the relay node R $y_{22}$ may denote a received signal of the second destination node D2 with respect to the transmission signal $x_R$ $y_{11}$ may denote a received signal when the first destination node D1 overhears the transmission signal $x_2(t)$ $y_{12}$ may denote a received signal of the first destination node D1 with respect to the transmission signal $x_R$ Also, it may be assumed that every variance of $n_R$, $n_{21}$, $n_{22}$, $n_{11}$, $n_{12}$ is 1, and every channel is a slow fading channel. Also, it may be assumed that a data rate applicable to each channel is C. When a length of a $j_{th}$ period of an $i_{th}$ time period is $t_{ij}$, and a data rate applicable in the length $t_{ij}$ is $R_{ij}$, $R_{ij}$ may be represented as, $$R_{11} = \min\left(C\left(\frac{|h_{12}|^2 P}{N}\right), C\left(\frac{|h_{1R}|^2 P}{N}\right)\right),$$

$$R_{12} = C\left(\frac{|h_{1R}|^2 P}{N}\right)$$

$$R_{21} = \min\left(C\left(\frac{|h_{21}|^2 P}{N}\right), C\left(\frac{|h_{2R}|^2 P}{N}\right)\right),$$

$$R_{22} = C\left(\frac{|h_{2R}|^2 P}{N}\right)$$

$$R_{31} = \min\left(C\left(\frac{|h_{R1}|^2 P}{N}\right), C\left(\frac{|h_{R2}|^2 P}{N}\right)\right)$$

$$R_{32} = C\left(\frac{|h_{R1}|^2 P}{N}\right),$$

$$R_{33} = C\left(\frac{|h_{R2}|^2 P}{N}\right) \quad \text{[Equation 2]}$$

where N may denote noise, and P may denote transmission power of every node. In this instance, the sum data rate for the first destination node D1 and the second destination node D2 may be represented as, $$\text{sum data rate} = 2t_{31}R_{31} + t_{32}R_{32} + t_{33}R_{33} \quad \text{[Equation 3]}$$

In this instance, the wireless network may determine the length, $t_{ij}$, to enable the sum data rate of Equation 3 to be maximized. Here, a constraint may be used. The constraint may be represented as, $$t_{11}R_{11} = t_{21}R_{21} = t_{31}R_{31}$$

$$t_{12}R_{12} = t_{32}R_{32}, \; t_{22}R_{22} = t_{33}R_{33}$$

$$\sum_{i,j} t_{i,j} = 1 \quad \text{[Equation 4]}$$

where a sum of $t_{ij}$ may be normalized.

Accordingly, the wireless network may optimize a 1-1 partial period $t_{11}$, a 1-2 partial period $t_{12}$, a 2-1 partial period $t_{21}$, a 2-2 partial period $t_{22}$, a 3-1 partial period $t_{31}$, and a 3-2 partial period $t_{32}$ which may enable the sum data rate to be maximized using Equation 1 through Equation 4.

However, it may be ascertained that the second source node S2 does not transmit the second source message M2 during the first time period when the first source node S1 transmits the first source message M1 as shown in FIG. 3. When the relay node R may use a Successive Interference Cancellation (SIC) scheme, the first source node S1 and the second source node S2 may simultaneously transmit the first source message M1 and the second source message M2. When the first source node S1 and the second source node S2 simultaneously transmit the first source message M1 and the second source message M2, three time periods may be reduced to two time periods, which is described with reference to FIG. 4 and FIG. 5.

Figure 4:
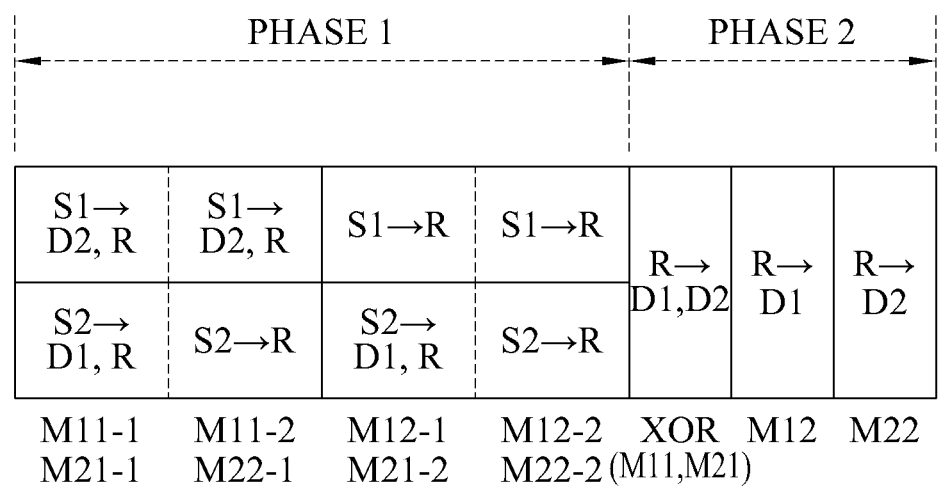
FIG. 4 is a diagram illustrating an operation of an exemplary wireless network using partial source messages in two time periods.

FIG. 4 illustrates an operation of an exemplary wireless network using partial source messages in two time periods.

Figure 5:
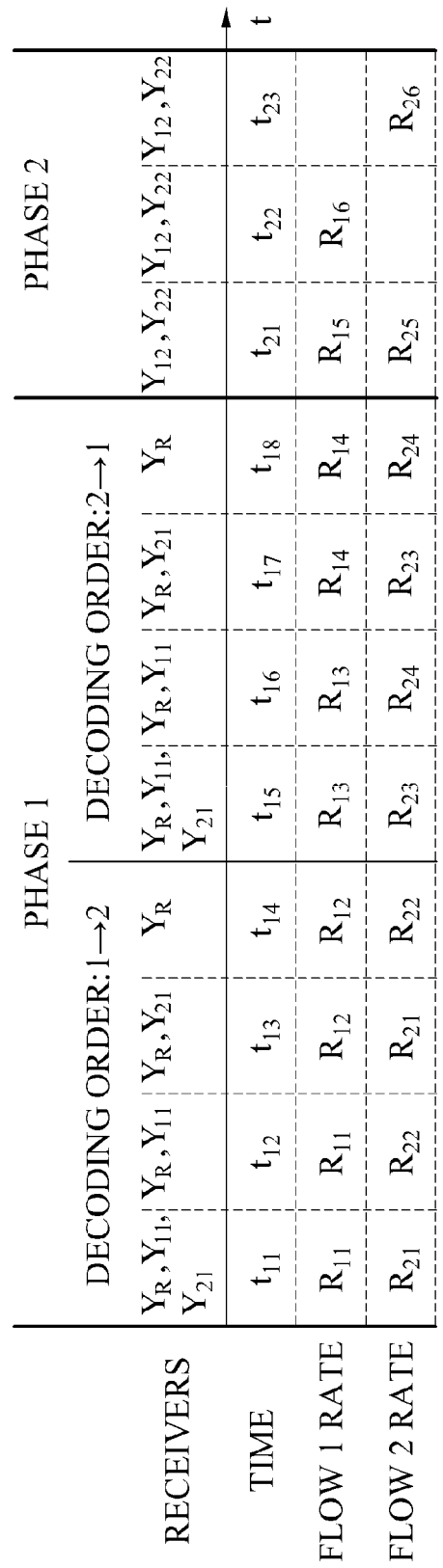
FIG. 5 is a diagram illustrating a data rate for a first source message, a data rate for a second source message, and a length of each time period based on a decoding order of a relay node in association with the operation of the exemplary wireless network of FIG. 4.

FIG. 5 illustrates a data rate for a first source message, a data rate for a second source message, and a length of each time period based on a decoding order of a relay node in association with the operation of the exemplary wireless network of FIG. 4.

A first source message M1 may be divided into a 1-1 partial source message M11 and a 1-2 partial source message M12, and a second source message M2 may be divided into a 2-1 partial source message M21 and a 2-2 partial source message M22. Also, the 1-1 partial source message M11 may be divided into a message M11-1 and a message M11-2, and the 1-2 partial source message M12 may be divided into a message M12-1 and a message M12-2. Also, the 2-1 partial source message M21 may be divided into a message M21-1 and a message M21-2, and the 2-2 partial source message M22 may be divided into a message M22-1 and a message M22-2.

A first source node S1 may transmit the message M11-1 to a second destination node D2 and a relay node R during a first period of a first time period. The first time period may correspond to a phase 1. At the same time, a second source node S2 may transmit the message M21-1 to a first destination node D1 and the relay node R.

Also, the first source node S1 may transmit the message M11-2 to the second destination node D2 and the relay node R, and the second source node S2 may transmit the message M22-1 to the relay node R during a second period of the first time period.

Also, the first source node S1 may transmit the message M12-1 to the relay node R, and the second source node S2 may transmit the message M21-2 to the first destination node D1 and the relay node R during a third period of the first time period.

Also, the first source node S1 may transmit the message M12-2 to the relay node R, and the second source node S2 may transmit the message M22-2 to the relay node R during a fourth period of the first time period.

Here, for example, it may be assumed that the relay node R uses an SIC scheme to distinguish a flow of the first source message M1 from a flow of the second source message M2.

In this instance, the relay node R may generate a network-coded message XOR(M11, M21) using the message M11 and the message M21. The message M11 is received during the first period and the second period of the first time period, and the message M21 is received during the first period and the third period of the first time period.

Also, the relay node R may transmit the network-coded message, XOR(M11, M21), to the first destination node D1 and the second destination node D2 during a first period of a second time period. The second time period may correspond to a phase 2. Also, the relay node R may transmit the message M12 to the first destination node D1 during a second period of the second time period, and transmit the message M22 to the second destination node D2 during a third period of the second time period.

In this instance, the first destination node D1 may decode the network-coded message, XOR(M11, M21), using the message M21 overheard during the first period and the third period of the first time period, and thereby may extract the message M11. Similarly, the second destination node D2 may extract the message M21 from the network-coded message, XOR(M11, M21), using the message M11 overheard during the first period and the second period of the first time period.

Accordingly, the first destination node D1 may successfully extract the message M11 and the message M12, and the second destination node D2 may also successfully extract the message M21 and the message M22.

However, a data rate applicable during each of the periods may vary depending on a decoding order or an order that the relay node R eliminates or reduces interference from a received signal.

For example, when the relay node R first decodes the flow of the first source message M1 using the SIC scheme, the flow of the second source message M2 may function as interference with respect to the flow of the first source message M1. Accordingly, the data rate for the flow of the first source message M1 may be affected by the interference with respect to the flow of the second source message M2. Conversely, when the relay node R first decodes the flow of the second source message M2, the flow of the second source message M2 may be removed from the received signal. Accordingly, the flow of the second source message M2 may not function as interference with respect to the flow of the first source message M1. Also, the data rate for the flow of the first source message M1 may not be affected by the flow of the second source message M2.

Thus, in the wireless network, the relay node R may calculate a data rate applicable in each of the periods based on a decoding order with respect to the flow of the first source message M1 and the flow of the second source message M2. Also, the wireless network may optimize a length of each of the periods based on the data rate calculated based on the decoding order.

When the relay node R decodes the flow of the first source message M1 earlier than the flow of the second source message M2 using the SIC scheme, the first time period corresponding to the phase 1 may be represented as four periods $t_{11}$, $t_{12}$, $t_{13}$, and $t_{14}$. Conversely, when the relay node R decodes the flow of the second source message M2 earlier than the flow of the first source message M1, the first time period may be represented as four periods $t_{15}$, $t_{16}$, $t_{17}$, and $t_{18}$. Also, $Y_R$ may denote a received signal of the relay node R during the first time period, $Y_{11}$ may denote a received signal of the first destination node D1 during the first time period, and $Y_{21}$ may denote a received signal of the second destination node D2 during the first time period. Also, $Y_{12}$ may denote a received signal of the first destination node D1 during the second time period, and $Y_{22}$ may denote a received signal of the second destination node D2 during the second time period.

In this instance, the wireless network may calculate the data rate for the flow of the first source message M1 and the data rate for the flow of the second source message M2 during each of the eight periods, $t_{11}$, $t_{12}$, $t_{13}$, $t_{14}$, $t_{15}$, $t_{16}$, $t_{17}$, and $t_{18}$, based on the decoding order. The data rate for the flow of the first source message M1 and the data rate for the flow of the second source message M2 may be calculated as, $$R_{11} = \min\left(C\left(\frac{|h_{12}|^2 P}{N}\right), C\left(\frac{|h_{1R}|^2 P}{N + |h_{2R}|^2 P}\right)\right)$$ [Equation 5]

$$R_{21} = \min\left(C\left(\frac{|h_{21}|^2 P}{N}\right), C\left(\frac{|h_{2R}|^2 P}{N}\right)\right)$$

$$R_{13} = \min\left(C\left(\frac{|h_{12}|^2 P}{N}\right), C\left(\frac{|h_{1R}|^2 P}{N}\right)\right)$$

$$R_{14} = C\left(\frac{|h_{1R}|^2 P}{N}\right)$$

$$R_{23} = \min\left(C\left(\frac{|h_{21}|^2 P}{N}\right), C\left(\frac{|h_{2R}|^2 P}{N + |h_{1R}|^2 P}\right)\right)$$

$$R_{24} = C\left(\frac{|h_{2R}|^2 P}{N + |h_{1R}|^2 P}\right).$$

$$R_{31} = \min\left(C\left(\frac{|h_{R1}|^2 P}{N}\right), C\left(\frac{|h_{R2}|^2 P}{N}\right)\right)$$

$$R_{32} = C\left(\frac{|h_{R1}|^2 P}{N}\right)$$

$$R_{33} = C\left(\frac{|h_{R2}|^2 P}{N}\right)$$

In this instance, a sum data rate for the first destination node D1 and the second destination node D2 may be represented as, sum data rate=$2t_{31}R_{31}+t_{32}R_{32}+t_{33}R_{33}$ [Equation 6]

In this instance, the wireless network may determine a length of each of the eight periods, $t_{11}$, $t_{12}$, $t_{13}$, $t_{14}$, $t_{15}$, $t_{16}$, $t_{17}$, and $t_{18}$, such that the sum data rate for the first destination node D1 and the second destination node D2 may be maximized. The length of each of the eight periods, $t_{11}$, $t_{12}$, $t_{13}$, $t_{14}$, $t_{15}$, $t_{16}$, $t_{17}$, and $t_{18}$, may be determined by, $$t_{11}R_{11} + t_{12}R_{11} + t_{15}R_{13} + t_{16}R_{13} \geq$$ [Equation 7]

$$t_{21}R_{31}t_{11}R_{21} + t_{13}R_{12} + t_{15}R_{23} + t_{17}R_{23} \geq$$

$$t_{21}R_{31}t_{13}R_{12} + t_{14}R_{12} + t_{17}R_{14} + t_{18}R_{14} \geq$$

$$t_{22}R_{32}t_{12}R_{22} + t_{14}R_{22} + t_{16}R_{24} + t_{18}R_{24} \geq$$

$$t_{23}R_{33} \sum_{i,j} t_{i,j} = 1.$$

Accordingly, the wireless network may calculate a data rate for each of the eight periods, $t_{11}$, $t_{12}$, $t_{13}$, $t_{14}$, $t_{15}$, $t_{16}$, $t_{17}$, and $t_{18}$, based on the decoding order. Also, the wireless network may optimize the length of each of the eight periods, $t_{11}$, $t_{12}$, $t_{13}$, $t_{14}$, $t_{15}$, $t_{16}$, $t_{17}$, and $t_{18}$, based on the calculated data rate for each of the eight periods, $t_{11}$, $t_{12}$, $t_{13}$, $t_{14}$, $t_{15}$, $t_{16}$, $t_{17}$, and $t_{18}$. Specifically, the wireless network may determine the length of each of the eight periods, $t_{11}$, $t_{12}$, $t_{13}$, $t_{14}$, $t_{15}$, $t_{16}$, $t_{17}$, and $t_{18}$, such that the sum data rate for the first destination node D1 and the second destination node D2 may be maximized.

Figure 6:
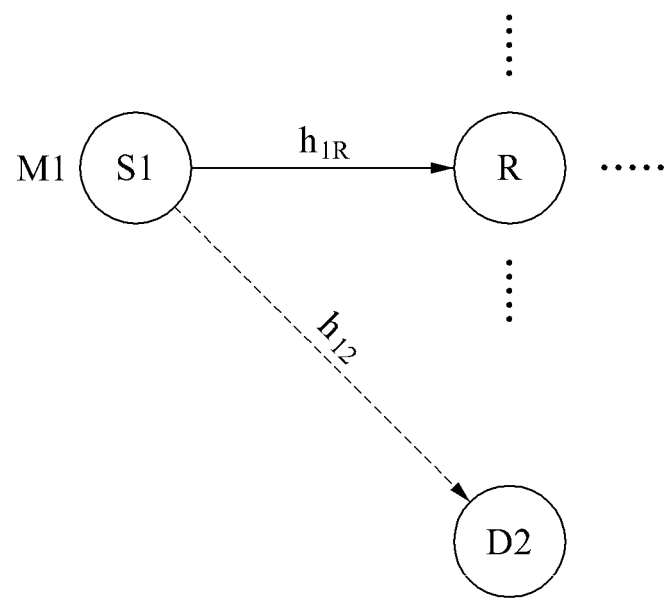
FIG. 6 is a diagram illustrating an example of a channel between a first source node and a relay node and a channel between the first source node and a second destination node.

FIG. 6 illustrates an example of a channel between a first source node S1 and a relay node R and a channel between the first source node S1 and a second destination node D2.

A channel $h_{1R}$ may be formed between the first source node S1 and the relay node R, and a channel $h_{12}$ may be formed between the first source node S1 and the second destination node D2. In this instance, the channel $h_{12}$ may be an overhearing channel, and the channel $h_{1R}$ may be a direct channel.

Generally, as described above, a state of the overhearing channel $h_{12}$ may be inferior to a state of the direct channel $h_{1R}$. Accordingly, when the first source node S1 simultaneously transmits symbols to the relay node R and the second destination node D2, the relay node R may extract symbols having an insignificant minimum symbol distance, since the state of the direct channel $h_{1R}$ is appropriate. However, the second destination node D2 may not appropriately extract the symbols having the insignificant minimum symbol distance since the state of the overhearing channel $h_{12}$ is not appropriate.

In this exemplary instance, the first source node S1 may use a superposition coding scheme to be appropriate for the state of the overhearing channel $h_{12}$ and the state of the direct channel $h_{1R}$. Here, the superposition coding scheme may indicate multiplexing and modulating a plurality of data streams to a single symbol stream, and be referred to as a hierarchical modulation or a layered modulation.

It may be assumed, for example, that a first source message M1 of the first source node S1 may be divided into a 1-1 partial source message M11 and a 1-2 partial source message M12. In this instance, the first source node S1 may apply the superposition coding scheme to the 1-1 partial source message M11 and the 1-2 partial source message M12, and thereby may generate a single first transmission message. For example, the first source node S1 may modulate the 1-1 partial source message M11 corresponding to the overhearing channel $h_{12}$ according to a Quadrature Phase Shift Keying (QPSK) constellation. Also, the first source node S1 may modulate the 1-2 partial source message M12 corresponding to the direct channel $h_{1R}$ according to a 16-Quadrature Amplitude Modulation (QAM) constellation. Therefore, the first source node S1 may generate the first transmission message. In this instance, the second destination node D2 may extract the 1-1 partial source message M11 with a relatively significant minimum symbol distance from the first transmission message, even though the state of the overhearing channel $h_{12}$ may not be appropriate. Also, the relay node R may extract the 1-2 partial source message M12 with a relatively insignificant minimum symbol distance from the first transmission message, since the state of the direct channel $h_{1R}$ is appropriate.

Figure 7:
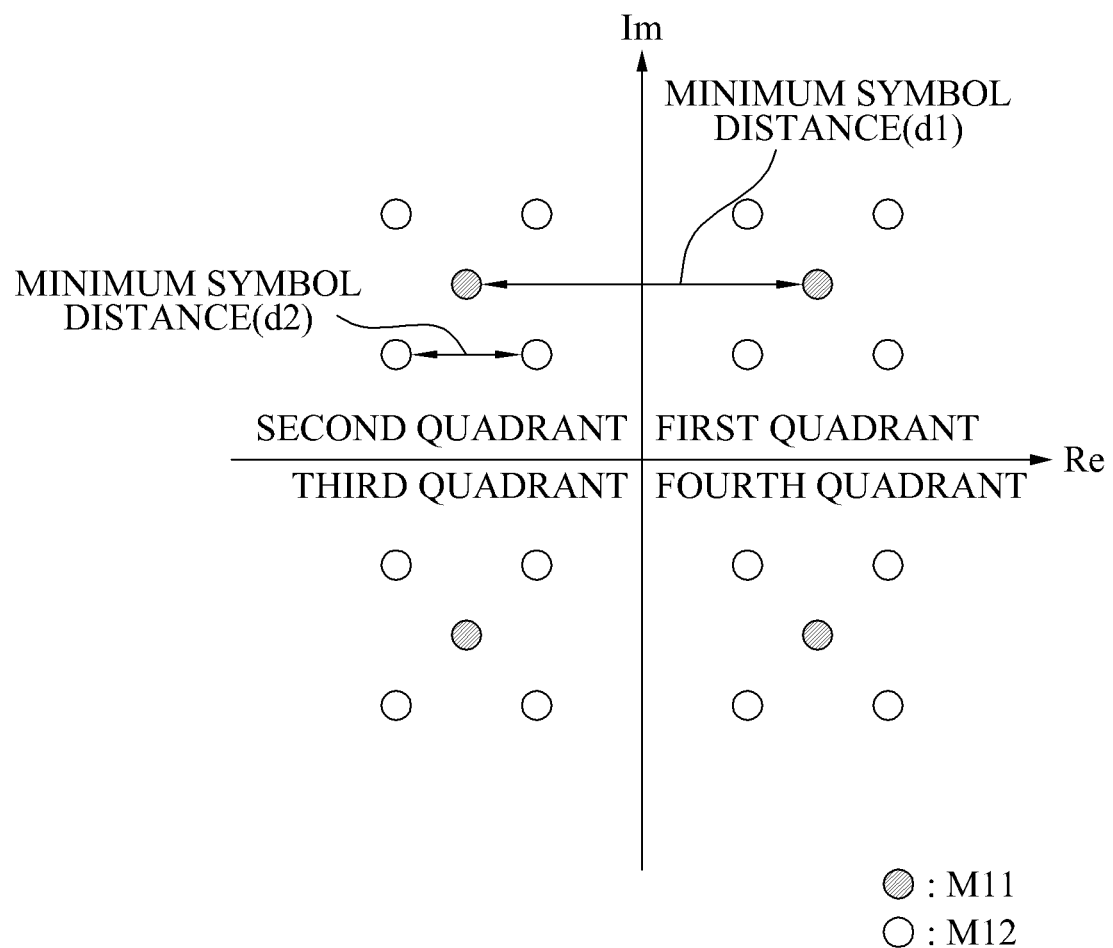
FIG. 7 is a diagram illustrating a constellation to describe an exemplary superposition coding scheme.

FIG. 7 illustrates a constellation to describe an exemplary superposition coding scheme.

Four shaded circles may indicate symbols according to a QPSK constellation for 1-1 partial source messages M11. Sixteen unshaded circles may indicate symbols according to 16-QAM constellation for 1-2 partial source messages M12.

A minimum symbol distance of the symbols corresponding to the four shaded circles may be d1, and a minimum symbol distance of the symbols corresponding to the 16 unshaded circles may be d2.

It may be determined which symbols of the shaded circles the 1-1 partial source messages M11 are mapped to, since d1 is greater than d2, even though the 1-1 partial source messages M11 are mapped to the four shaded circles. That is, even when a state of a channel is may not be appropriate for the mapped symbols to be transmitted, the 1-1 partial source messages M11 may be extracted from the symbols.

However, when the 1-2 partial source messages M12 are mapped to the 16 unshaded circles, a state of a channel should be appropriate to determine which symbols of the sixteen unshaded circles the 1-2 partial source messages M12 are mapped to, since d2 is shorter than d1.

A first source node S1 may divide a first source message M1 into a 1-1 partial source message M11 and a 1-2 partial source message M12, and apply a superposition coding scheme to the 1-1 partial source message M11 and the 1-2 partial source message M12 based on a state of each of an overhearing channel and a direct channel. Accordingly, the first source node S1 may generate a first transmission message.

In this instance, a relay node R may extract both the 1-1 partial source message M11 and the 1-2 partial source message M12 from the first transmission message since the relay node R has a direct channel with a superior state. However, a second destination node D2 may extract the 1-1 partial source message M11 from the first transmission message since the second destination node D2 has a direct channel with an inferior state.

Figure 8:
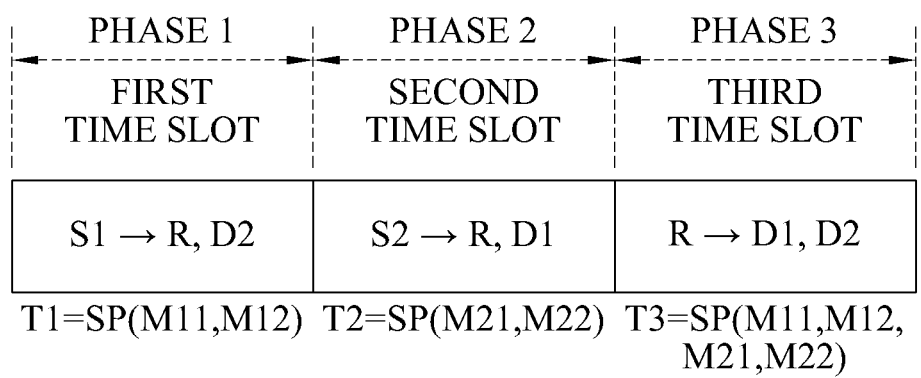
FIG. 8 is a diagram illustrating an example of an operation of a wireless network using a superposition coding scheme in each time slot.

FIG. 8 illustrates an example of an operation of a wireless network using a superposition coding scheme in each time slot.

In the wireless network, a first source node S1 may transmit a first transmission message (T1=SP(M11, M12)) to a relay node R and a second destination node D2 in a first time slot corresponding to a phase 1. In this instance, the first transmission message T1 may be generated by superposition-coding a 1-1 partial source message M11 and a 1-2 partial source message M12. Here, SP(M11, M12) may indicate the first transmission message T1 generated by superposition-coding the 1-1 partial source message M11 and the 1-2 partial source message M12.

In this instance, although a state of an overhearing channel between a first source node S1 and a second destination node D2 may not be appropriate, the second destination node D2 may extract the 1-1 partial source message M11 from the superposition-coded first transmission message T1. Also, since a state of a channel between the first source node S1 and the relay node R is appropriate, the relay node R may extract the 1-1 partial source message M11 and the 1-2 partial source message M12 from the superposition-coded first transmission message T1.

Also, a second source node S2 may transmit a superposition-coded second transmission message T2 to the relay node R and a first destination node D1 in a second time slot corresponding to a phase 2. Here, the second transmission message T2 may be generated by superposition-coding a 2-1 partial source message M21 and a 2-2 partial source message M22.

In this instance, although a state of an overhearing channel between the first destination node D1 and the second source node S2 may not be appropriate, the second transmission message T2 may be superposition-coded to enable the first destination node D1 to appropriately extract the 2-1 partial source message M21 from the second transmission message T2. For example, the 2-1 partial source message M21 may be modulated by a QPSK, and the 2-2 partial source message M22 may be modulated to a 16-QAM. However, the relay node R may extract both the 2-1 partial source message M21 and the 2-2 partial source message M22 from the second transmission message T2.

Also, the relay node R may transmit a relay message to the first destination node D1 and the second destination node D2 in a third time slot corresponding to a phase 3. The relay message may be associated with the first transmission message T1 and the second transmission message T2. Also, the relay message may be generated in various ways. For example, the relay message may be generated by superposition-coding a first source message M1 and a second source message M2, or by superposition-coding the 1-1 partial source message M11, the 1-2 partial source message M12, the 2-1 partial source message M21, and the 2-2 partial source message M22.

In this instance, the first destination node D1 may extract the first source message M1 from the relay message by referring to the overheard 2-1 partial source message M21. Also, the second destination node D2 may extract the second source message M2 from the relay message by referring to the overheard 2-2 partial source message M22.

That is, the first destination node D1 may extract, with higher quality, the first source message M1 using the overheard 2-1 partial source message M21. For example, since the second destination node D2 may remove an element, associated with the 2-1 partial source message M21, from the relay message, a Signal to Interference plus Noise Ratio (SINR) with respect to the 1-1 partial source message M11 may be represented as P11(P12+P21+P22−P21+N)=P11/(P12+P22+N). That is, an interference caused by P21 may be reduced, and thus improvement may be achieved. Here, P11, P12, P21, and P22 may denote power of each of the 1-1 partial source message M11, the 1-2 partial source message M12, the 2-1 partial source message M21, and the 2-2 partial source message M22, and N may denote noise. Similarly, an SINR with respect to the 1-2 partial source message M12 may increase in proportion to the reduced interference caused by P21. Also, the second destination node D2 may extract, with higher quality, the 2-1 partial source message M21 and the 2-2 partial source message M22 by referring to the overheard 1-1 partial source message M11.

Also, a length of each of the first time slot, the second time slot, and the third time slot may be adaptively adjusted to enable a sum data rate to be maximized, which has been described above with reference to Equation 1 through Equation 7, and thus further detailed descriptions will be omitted here.

Figure 9:
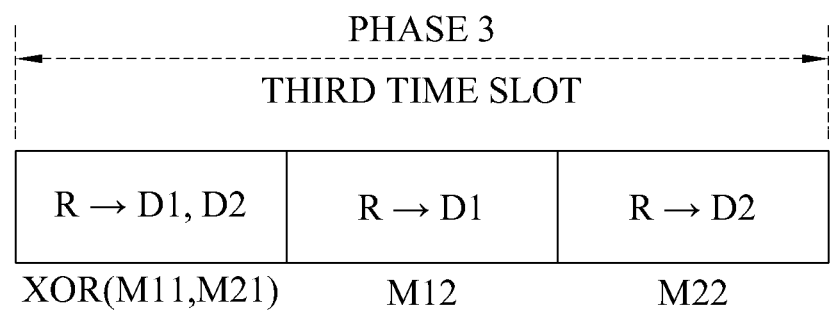
FIG. 9 is a diagram illustrating another example of a phase 3 of FIG. 8.

FIG. 9 illustrates another example of the phase 3 of FIG. 8. The relay node R may use a network coding scheme in the third time slot corresponding to the phase 3.

That is, in a first period of the third time slot, the relay node R may transmit, to the first destination node D1 and the second destination node D2, a message XOR (M11, M21) network-coded according to the network coding scheme as a relay message. In this instance, since the first destination node D1 overhears the 2-1 partial source message M21, the first destination node D1 may extract the 1-1 partial source message M11 from the network-coded message XOR (M11, M21). Also, since the second destination node D2 overhears the 1-1 partial source message M11, the second destination node D2 may extract the 1-1 partial source message M11 from the network-coded message XOR (M11, M21).

In a second period of the third time slot, the relay node R may transmit the 1-2 partial source message M12 to the first destination node D1 as the relay message. The first destination node D1 may ascertain the first source message M1 using the 1-1 partial source message M11, extracted in the first period of the third time slot, and the 1-2 partial source message M12 received in the second period of the third time slot.

In a third period of the third time slot, the relay node R may transmit the 2-2 partial source message M22 to the second destination node D2 as the relay message. The second destination node D2 may ascertain the second source message M2 using the 2-1 partial source message M21, extracted in the first period of the third time slot, and the 2-2 partial source message M22 received in the third period of the third time slot.

Figure 10:
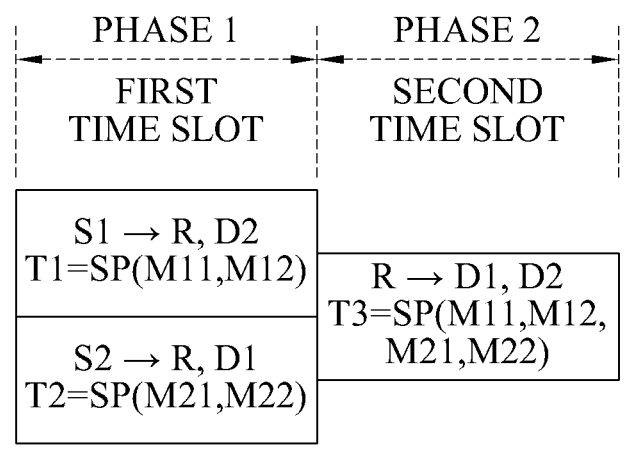
FIG. 10 is a diagram illustrating another example of an operation of a wireless network using a superposition coding scheme in each time slot.

FIG. 10 illustrates another example of an operation of a wireless network using a superposition coding scheme in each time slot.

In the wireless network, a first source node S1 and a second source node S2 may transmit source messages to a first destination node D1 and a second destination node D2 using two time slots on a premise that a relay node R uses an SIC scheme.

In a first time slot corresponding to a phase 1, the first source node S1 and the second source node S2 may simultaneously transmit transmission messages T1 and T2. Specifically, the first source node S1 may apply a superposition coding scheme to a 1-1 partial source message M11 and a 1-2 partial source message M12, and thereby may generate a first transmission message T1. Also, the second source node S2 may apply the superposition coding scheme to a 2-1 partial source message M21 and a 2-2 partial source message M22, and thereby may generate a second transmission message T2.

Also, the first source node S1 may transmit the first transmission message T1 to the relay node R and the second destination node D2 in the first time slot. The second source node S2 may transmit the second transmission message T2 to the relay node R and the first destination node D1 in the same first time slot. That is, the first transmission message T1 and the second transmission message T2 may be received in the same time slot. The relay node R may apply the SIC scheme to the first transmission message T1 and the second transmission message T2, and thereby may distinguish the first transmission message T1 from the second transmission message T2.

Also, when the relay node R distinguishes the first transmission message T1 from the second transmission message T2 using the SIC scheme, the relay node R may extract the 1-1 partial source message M11, the 1-2 partial source message M12, the 2-1 partial source message M21 and the 2-2 partial source message M22 from the first transmission message T1 and the second transmission message T2, since the relay node R has direct channels with a superior state. In one general example, however, the second destination node D2 may extract only the 1-1 partial source message M11 from the first transmission message T1, since the second destination node D2 has overhearing channels with an inferior state. Also, the first destination node D1 may extract only the 2-2 partial source message M22 from the second transmission message T2 in this general example.

In a second time slot corresponding to a phase 2, the relay node R may transmit a relay message T3 to the first destination node D1 and the second destination node D2. The relay message T3 may be generated by applying the superposition coding scheme to the extracted 1-1 partial source message M11, 1-2 partial source message M12, 2-1 partial source message M21 and 2-2 partial source message M22.

In this instance, the first destination node D1 may extract the 1-1 partial source message M11 and the 1-2 partial source message M12 from the relay message T3 by referring to the overheard 2-1 partial source message M21. Here, the first destination node D1 may extract, with higher quality or in a higher SINR, the 1-1 partial source message M11 and the 1-2 partial source message M12 using the overheard 2-1 partial source message M21.

Similarly to the first destination node D1, the second destination node D2 may extract the 2-1 partial source message M21 and the 2-2 partial source message M22 from the relay message T3 by referring to the 1-1 partial source message M11. Here, the second destination node D2 may extract, with higher quality or in a higher SINR, the 2-1 partial source message M21 and the 2-2 partial source message M22 using the overheard 1-1 partial source message M11.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media may include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above or vice versa. In addition, a computer-readable storage medium may be distributed among computer systems connected through a network and computer-readable codes or program instructions may be stored and executed in a decentralized manner.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An operation method of a relay node, the operation method comprising:
receiving a first transmission message from a first source node in a first time slot, the first transmission message comprising a superposition-coding of a 1-1 partial source message and a 1-2 partial source message that are included in a first source message corresponding to the first source node;
receiving a second transmission message from a second source node in a second time slot, the second transmission message comprising a superposition-coding of a 2-1 partial source message and a 2-2 partial source message that are included in a second source message corresponding to the second source node; and
transmitting a relay message to a first destination node corresponding to the first source node and to a second destination node corresponding to the second source node, in a third time slot, the relay message comprising a superposition-encoding of the 1-1, 1-2, 2-1, and 2-2 partial source messages,
wherein the first source node, the second source node, the first destination node and the second destination node are different from each other.

2. The operation method of claim 1, further comprising:
extracting the 1-1 partial source message and the 1-2 partial source message from the first transmission message,
wherein the second destination node receives the first transmission message from the first source node in the first time slot, and extracts the 1-1 partial source message from the first transmission message.

3. The operation method of claim 2, wherein the first transmission message is transmitted through a channel between the first source node and the relay node and a channel between the first source node and the second destination node.

4. The operation method of claim 1, further comprising:
extracting the 2-1 partial source message and the 2-2 partial source message from the second transmission message, wherein the first destination node receives the second transmission message from the second source node in the second time slot, and extracts the 2-1 partial source message from the second transmission message.

5. The operation method of claim 4, wherein the second transmission message is transmitted through a channel between the second source node and the relay node and a channel between the second source node and the first destination node.

6. The operation method of claim 1, wherein a length of each of the first time slot, the second time slot, and the third time slot is adjusted to maximize a sum data rate for the first destination node and the second destination node.

7. The operation method of claim 1, wherein each of the first destination node and the second destination node extracts the first source message and the second source message, respectively, from the relay message.

8. The operation method of claim 1, wherein the transmitting of the relay message comprises:
generating a network-coded message based on the 1-1 partial source message and the 2-1 partial source message, the network-coded message being included in the relay message.

9. The operation method of claim 1, wherein:
the first destination node receives the second transmission message from the second source node in the second time slot, and extracts the 2-1 partial source message from the second transmission message; and
the second destination node receives the first transmission message from the first source node in the first time slot, and extracts the 1-1 partial source message from the first transmission message.

10. An operation method of a relay node, the operation method comprising:
receiving, in a first time period, a first transmission message from a first source node, and a second transmission message from a second source node, the first transmission message comprising a superposition-coding of a 1-1 partial source message and a 1-2 partial source message that are included in a first source message corresponding to the first source node, and the second transmission message comprising a superposition-coding of a 2-1 partial source message and a 2-2 partial source message that are included in a second source message corresponding to the second source node;
distinguishing the first transmission message from the second transmission message based on a Successive Interference Cancellation (SIC) scheme; and
transmitting a relay message to a first destination node corresponding to the first source node and to a second destination node corresponding to the second source node, in a second time period, the relay message comprising a superposition-coding of the 1-1, 1-2, 2-1, and 2-2 partial source messages,
wherein the first source node, the second source node, the first destination node and the second destination node are different from each other.

11. The operation method of claim 10, wherein:
the first destination node receives, in the first time period, the second transmission message from the second source node, and extracts the 2-1 partial source message from the second transmission message; and
the second destination node receives, in the first time period, the first transmission message from the first source node, and extracts the 1-1 partial source message from the first transmission message.

12. The operation method of claim 10, wherein each of the first destination node and the second destination node extracts the first source message and the second source message, respectively, from the relay message.

13. The operation method of claim 10, further comprising:
extracting the 1-1 partial source message and the 1-2 partial source message from the first transmission message, the second destination node receiving, in the first time period, the first transmission message from the first source node, and extracting the 1-1 partial source message from the first transmission message; and
extracting the 2-1 partial source message and the 2-2 partial source message from the second transmission message, the first destination node receiving, in the first time period, the second transmission message from the second source node, and extracting the 2-1 partial source message from the second transmission message.

14. The operation method of claim 10, further comprising:
decoding the first transmission message and the second transmission message based on a predetermined decoding order.

15. The operation method of claim 10, wherein a length of each of the first time period and the second time period is adjusted to maximize a sum data rate for the first destination node and the second destination node.

16. A computer-readable storage medium storing a program to provide an operation method of a relay node, comprising instructions to cause a computer to:
receive a first transmission message from a first source node in a first time period, the first transmission message comprising a superposition-coding of a 1-1 partial source message and a 1-2 partial source message that are included in a first source message corresponding to the first source node;
receive a second transmission message from a second source node in a second time period, the second transmission message comprising a superposition-coding of a 2-1 partial source message and a 2-2 partial source message that are included in a second source message corresponding to the second source node; and
transmit a relay message to a first destination node corresponding to the first source node and to a second destination node corresponding to the second source node, in a third time period, the relay message comprising a superposition-coding of the 1-1, 1-2, 2-1, and 2-2 partial source messages,
wherein the first source node, the second source node, the first destination node and the second destination node are different from each other.

17. The computer-readable storage medium of claim 16, wherein a length of each of the first time period, the second time period, and the third time period is adjusted to maximize a sum data rate for the first destination node and the second destination node.

18. The operation method of claim 9, wherein:
the first destination node extracts the first source message from the relay message based on the 2-1 partial source message extracted from the second transmission message; and
the second destination node extracts the second source message from the relay message based on the 1-1 partial source message extracted from the first transmission message.

19. The operation method of claim 18, wherein:
the first destination node removes, from the relay message, an element associated with the 2-1 partial source message extracted from the second transmission message to extract the first source message; and
the second destination node removes, from the relay message, an element associated with the 1-1 partial source message extracted from the first transmission message to extract the second source message.

20. The operation method of claim 9, further comprising:
generating a network-coded message based on the 1-1 partial source message and the 2-1 partial source message, the network-coded message being included in the relay message, the first destination node extracting the 1-1 partial source message from the network-coded message based on the 2-1 partial source message extracted from the second transmission message, and the second destination node extracting the 2-1 partial source message from the network-coded message based on the 1-1 partial source message extracted from the first transmission message;
transmitting the 1-2 partial source message to the first destination node in the third time slot, the first destination node ascertaining the first source message based on the 1-1 partial source message extracted from the network-coded message and the 1-2 partial source message; and
transmitting the 2-2 partial source message to the second destination node in the third time slot, the second destination node ascertaining the second source message based on the 2-1 partial source message extracted from the network-coded message and the 2-2 partial source message.

* * * * *